May 26, 1959   W. A. FLETCHER   2,888,272
MULTIPLE VALVE CONTROLLED FLUID PRESSURE SUSPENSION
Filed June 18, 1956

INVENTOR.
WILLIAM A. FLETCHER
BY
ATTORNEY

United States Patent Office 2,888,272
Patented May 26, 1959

2,888,272

MULTIPLE VALVE CONTROLLED FLUID PRESSURE SUSPENSION

William A. Fletcher, Daleville, Ind., assignor to General Motors Corporation, Detroit, Mich., a corporation of Delaware Application June 18, 1956, Serial No. 592,190

8 Claims. (Cl. 280—124)

This invention relates to a suspension system for a vehicle and is particularly concerned with systems of the air ride type.

One object of the invention is to provide an air ride suspension system for a vehicle wherein controls are provided for leveling the vehicle upon sway thereof or changes or shift in load. In carrying out this object, it is another object of the invention to utilize a damped or slow response valve system for controlling the levelizing action during normal operation with substantially constant load and a fast response valve system for major changes in level caused by sway on curves, shifting loads, etc., wherein the fast response system overrides the slow response control only when a sensing device renders the fast response system operative due to the presence of a predetermined condition.

Another object of the invention is to provide an air spring control system for controlling the supply and exhaust of air to an air spring wherein a pair of slow response valves normally control the air into and from said spring while a pair of normally inoperative fast response valves are superimposed on the system which valves are rendered operative by an attitude control device to override the control of the slow response valves under certain conditions as determined by the attitude control device for causing fast levelizing action of the spring whereupon the slow response valves again take over the control.

Further objects and advantages of the present invention will be apparent from the following description, reference being had to the accompanying drawings wherein preferred embodiments of the present invention are clearly shown.

Figure 1:
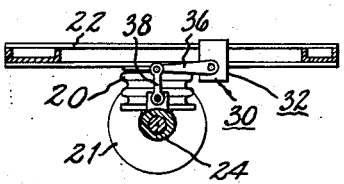
Figure 1 is a schematic drawing showing an air spring mounted between a frame and axle of a vehicle.

Referring to Figure 1, the system preferably includes an air spring, or bellows 20, for each wheel 21 of the vehicle. The air spring 20 is mounted between the vehicle chassis 22 and wheel axle 24. Each air spring control comprises two interconnected devices 30 and 32 which include valves to control the flow of air to the spring 20. The devices 30 and 32 are preferably mounted on the chassis and are connected by an actuator arm 34 and links 36 and 38 to the axle so that relative movement between the axle and chassis is transmitted by the arm 34 to the devices 30 and 32. If desired, the devices 30 and 32 may be separately connected through separate actuating arms.

The device 30 includes two slow response valves that are damped against rapid movement. Rossman Patent 2,670,201 discloses a somewhat similar device and explains the damping action in detail. This type of control smooths out chatter caused by rough roads, etc., wherein movements of relatively small magnitude are being transmitted to the spring.

The device 32 includes two fast response valves but is normally inoperative or unresponsive except when marked changes in position between chassis and axle occur. These changes are sensed by a sway or attitude switch 40 which controls a solenoid operated bypass valve 42 that renders the device 32 responsive.

Thus, the valving device 32 acts to cause rapid leveling action upon major changes in position of the chassis relative to the axle while the device 30 acts to more slowly adjust for minor variations in level.

More specifically, the device 30, which may be termed the slow response device, comprises a pair of spring loaded, normally closed valves 50 and 52. The valve 50 has an inlet 54 and an outlet 56 while the valve 52 has an inlet 58 and an outlet 60. The two valves 50 and 52 are actuated by a rocking member 62 which is connected to actuator arm 34 by a pivotal member 64 spring pressed between pressure members 66 and 68. Opposite ends of member 62 engage pins 70 and 72, respectively, which operate the valves 50 and 52, respectively. Normally, the member 62 will rock or tilt with each change in position of the arm 34 as occasioned by movement of link 36. This would cause frequent and rapid opening and closing of the valves 50 and 52. In order to prevent such a condition and provide for slower action, a dampener 74 is provided which comprises opposed pistons 76 and 78, which act upon an extension 80 of the member 62. The chambers in which pistons 76 and 78 operate are connected by a passage 82 controlled by a valve 84 which may be adjusted to vary the dampening action as desired.

Control device 32, which may be termed a fast response device, includes a pair of spring biased, normally closed valves 86 and 88. The valves include pressure passage 90, balancing inlets 92 and 94, respectively, and a common outlet passage 96. Pins 98 and 100 control the operation of valves 86 and 88, respectively. A second rocking member 102 is provided which is also attached to the actuator bar 34. The member 102 includes pressure members 104 and 106 and is similar to member 62 used in connection with control device 30. Rocking of member 102 causes opening and closing of valves 86 and 88 through movement of pins 98 and 100, respectively, under certain conditions to be explained hereinafter.

A third component of the system is the solenoid control valve 42 which includes a body 110, a spring pressed plunger 112 and a normally closed valve seat 114. A coil 116 in circuit with the attitude switch 40, here shown as a mercury switch, and a battery 118 controls the operation of the valve 42 from its normal position whenever the switch 40 closes the circuit to coil 116. In this respect, other switches may be included in parallel with the attitude switch to cause the valve 42 to operate in response to various conditions. For example, switches actuated to closed position by the opening or doors, etc.

Pressurized air for the air spring 20 and other springs (not shown) is supplied from a high pressure reservoir 120 supplied by a pump 122 from a low pressure reservoir 124. Conventional make-up means (not shown) may also be used to keep the system charged and compensate for slight leakage which may occur through the several seals used in connection with the valves.

Operation of the system may be explained as follows.

(1) Normal operation without sway and with the load substantially static. Under these conditions, the slow response device 30 controls the air spring 20 and levelizing action thereof. High pressure fluid from reservoir 120 passes through passage 130 and inlet 54 to valve 50 through which it passes, upon appropriate movement between the chassis and axle, to outlet 56, passage 132 to air spring 20. A branch of this high pressure also enters passage 92 of valve 86 which is closed while still another branch enters solenoid valve 42 through passage 134 and exhausts through passages 148 and 136 to enter passage 90 whereby valves 86 and 88 are pressure locked in closed position. It will also be noted that air passing through valve 50 and outlet 56 not only passes to the air spring 20 but also passes through duct 138 through passage 96 in device 32, passage 140, inlet 58 of valve 52, which is closed. Thus, the spring 20 is raised to cause the desired leveling action. If, however, the actuator moves to its other position, valve 50 remains closed and valve 52 is opened. In this case, air from the spring 20 exhausts through passages 132, 96, 140, through valve 52, outlet 60 and passage 142 to the reservoir 124 and the spring is lowered. Air from the low pressure reservoir 124 passes through passage 144 to pump 122 whence it is compressed and forced into the high pressure reservoir 120.

The entire control of air flow in the system during normal operation is based on the action of the valves 50 and 52 in device 30, due to the fact that valves 86 and 88 are in a state of unbalance and are locked closed. Thus, it is apparent that adjustments made to the spring 20 are in relatively slow response to changing conditions due to the damped action of the valves 50 and 52.

It will also be noted that a branch of the high pressure passage 130 and designated at 146 is provided for supplying air to like controls used in connection with other air springs as required. The control of each spring will be independent as determined by an actuator such as shown at 34 for the respective control devices.

(2) Changing load, sway on curves, etc. When these conditions prevail, the attitude switch 40 will be tilted sufficiently by transverse listing of the vehicle to close the circuit to the coil 116 of valve 42.

This will cause the valve 42 to close the passage 134 and to connect passage 136 through passages 148 and 150 to passage 138 which will substantially balance valves 86 and 88 whereby they may be opened by the actuator 34 through member 102. When this occurs, rapid response is available since there is no damping provided in the control of device 32. Thus, when valve 86 is opened, high pressure air is immediately available to the spring 20 through passages 96, 138 and 132 to level the vehicle. Tilting in the other direction will close valve 86 and open the exhaust valve 88 to permit flow of air from the spring 20 through passages 132, 138, 96, valve 88 and passage 94 to the reservoir 124.

Thus, the control of the device 32, while being superimposed upon the control of device 30, upon tilting movements of predetermined magnitude, actually overrides the control of device 30 due to its fast operation as distinguished from the dampened, slow response action of the device 30.

It is to be understood that control switches for other conditions may be connected in parallel with the attitude switch to obtain fast response under desired conditions. Also, an attitude switch responsive to pitch or longitudinal movement may be used either alone or in parallel with the switch 40 and/or other switches. Such deviations coming fully within the scope of this invention.

In the case of both devices 30 and 32, the valves 50 and 86, respectively, are high pressure valves and their operation results in supplying air to the spring 20 for raising the chassis relative to the axle. The valves 52 and 88 are exhaust valves and their opening permits air to exhaust from the spring 20 to the low pressure side of the system for lowering the chassis with respect to the axle.

Figure 2:
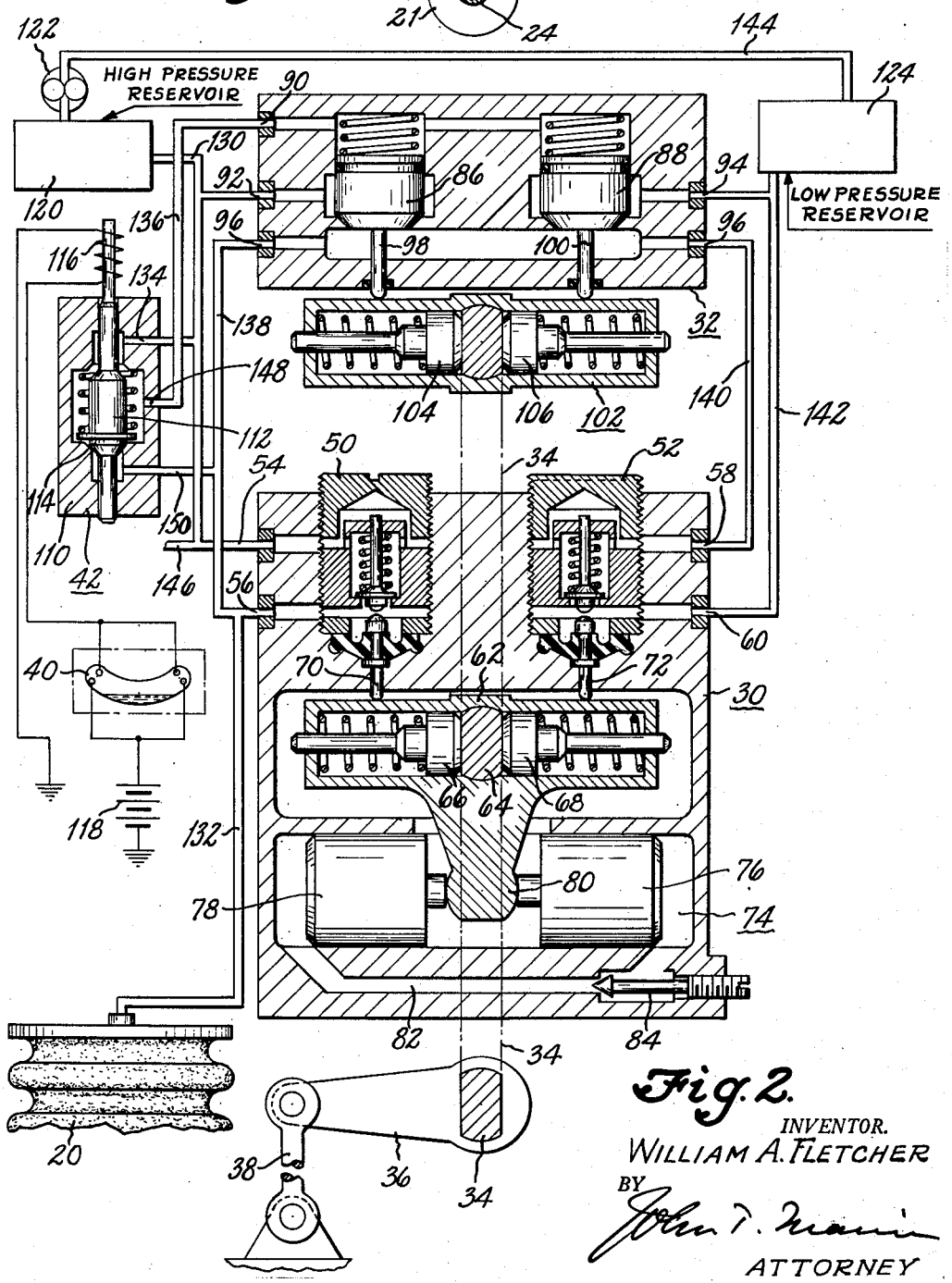
Figure 2 is a view in section of the valving means used in the control system disclosed herein.

In all instances, the device 32 is inoperative to function when the solenoid valve 42 is in the position shown in Figure 2, since the valves 86 and 88 are pressure locked against movement. When the switch 40 causes valve 42 to operate, the valves 86 and 88 are substantially balanced and are then controlled by vehicle position whereby they override the control of the device 30.

While the embodiments of the present invention as herein disclosed constitute preferred forms, it is to be understood that other forms might be adopted.

What is claimed is as follows:

1. In a closed air spring system for supporting a sprung mass relative to an unsprung mass and having a plurality of interconnected valves for controlling the supply of air in the system from a high pressure reservoir and the exhaust of air in the system to a low pressure reservoir for maintaining the spring system in substantially uniform operating position under varying conditions of load, the improvement comprising; an air spring to be controlled disposed between said masses for determining the position of the masses relative to one another, two separate valve controls, mounted on the sprung mass, and adapted to regulate the position of the sprung mass relative to the unsprung mass, an actuator for connecting the valve controls to the unsprung mass, the first of said valve controls being damped and of slow response to changes in position between the sprung and unsprung masses and the second of said valve controls being normally unresponsive to said actuator, an electrically operated valve for interconnecting the said two valve controls whereby the second control is rendered quickly responsive to said actuator to compensate quickly for changes in operating position between said masses for causing said air spring to return the system to its uniform operating position, and an attitude switch for energizing said electrically operated valve upon predetermined position changes of position thereof.

2. In a closed air spring system for supporting a sprung mass relative to an unsprung mass and having a plurality of interconnected valves for controlling the supply of air in the system from a high pressure reservoir and the exhaust of air in the system to a low pressure reservoir for maintaining the spring system in substantially uniform operating position under varying conditions of load, the improvement comprising; an air spring to be controlled disposed between said masses for determining the position of the masses relative to one another, a pair of damped slow response valves normally closed and adapted to control air passing into and out of said spring, mechanical actuator means sensitive to the relative position of the sprung and unsprung masses for actuating one or the other of said valves in accordance with said relative position whereby the spring is slowly controlled for maintaining a substantially constant level between said masses, a pair of undamped fast response valves normally locked in closed position and connected in parallel with the slow response valves and adapted to be controlled by said actuator means, and electrically operated means for unlocking said second pair of valves under certain operating conditions whereby said actuator is effective to control said fast response valves, said fast response valves, when operative, overriding the control of said slow response valves with respect to said spring.

3. In a closed air spring system for supporting a sprung mass relative to an unsprung mass and having a plurality of interconnected valves for controlling the supply of air in the system from a high pressure reservoir and the exhaust of air in the system to a low pressure reservoir for maintaining the spring system in substantially uniform operating position under varying conditions of load, the improvement comprising; an air spring to be controlled disposed between said masses for determining the position of the masses relative to one another, a pair of damped slow response valves normally closed and adapted to control air passing into and out of said spring, mechanical actuator means sensitive to the relative position of the sprung and unsprung masses for actuating one or the other of said valves in accordance with said relative position whereby the spring is slowly controlled for maintaining a substantially constant level between said masses, a pair of undamped fast response valves normally locked in closed position and connected in parallel with the slow response valves and adapted to be controlled by said actuator means, electrical means capable, when energized, of unlocking said fast response valves, and a tilt switch sensitive to transverse position of at least one of said masses for energizing said means whereby said actuator is effective to control said fast response valves, said fast response valves, when operative, overriding the control of said slow response valves with respect to said spring.

4. In a closed air spring system for supporting a sprung mass relative to an unsprung mass and having a plurality of interconnected valves for controlling the supply of air in the system from a high pressure reservoir and the exhaust of air in the system to a low pressure reservoir for maintaining the spring system in substantially uniform operating position under varying conditions of load, the improvement comprising; an air spring to be controlled disposed between said masses for determining the position of the masses relative to one another, a pair of damped slow response valves normally closed and adapted to control air passing into and out of said spring, mechanical actuator means sensitive to the relative position of the sprung and unsprung masses for actuating one or the other of said valves in accordance with said relative position whereby the spring is slowly controlled for maintaining a substantially constant level between said masses, a pair of undamped fast response valves normally pressure locked in closed position and connected in parallel with the slow response valves and adapted to be controlled by said actuator means, a solenoid valve normally in one position for pressure locking said fast response valves, a normally open electrical switch, for said valve, said switch when closed causing said valve to unlock said fast response valves, whereby said actuator is effective to control said fast response valves, said fast response valves, when operative, overriding the control of said slow response valves with respect to said spring.

5. In a closed air spring control system for supporting a sprung mass relative to an unsprung mass for maintaining a substantially uniform operating position between said masses under varying conditions of operation, the combination comprising; an air control device, a high pressure reservoir and a low pressure reservoir in a closed pressure system including said spring, reservoirs and control device, an actuator for the control device controlled by condition of the masses, said control device having two normally closed damped valves adapted to be opened selectively by said actuator, one for slowly admitting air from said high pressure reservoir to said spring and the other for slowing exhausting air from said spring to said low pressure reservoir according to the position of said damped valves as actuated by said actuator, said control device also having two normally closed undamped valves locked closed and adapted to be opened selectively by said actuator, and means responsive to a predetermined condition to unlock said undamped valves to override said damped valves for fast control of said spring.

6. In an air suspension system for a motor vehicle having an air spring positioned between the sprung mass and the unsprung mass of the vehicle for resilient support of the sprung mass on the unsprung mass and having control means supplying air to the air spring and exhausting air from the air spring as actuated in response to attitude changes of the vehicle, the combination of, air spring means to be controlled positioned between the sprung mass and the unsprung mass of a vehicle, a source of air under pressure, and a control device connected with said air source and including operating means connected with the vehicle to operate the said control device in response to attitude change of the vehicle relative to the running gear thereof and having a first damped valve means controlling air flow to the air spring from said source and exhaust of air from said air spring to effect thereby slow rate of response of the air spring in responding to one change of attitude of said vehicle and having a second undamped valve means controlling flow of air under pressure to said air spring and exhaust of air therefrom in response to attitude change of the vehicle to effect thereby a fast rate of response of the air spring in responding to a second change of attitude of said vehicle and locked in an inactive position to permit thereby said first valve means to be effective to control said air spring, and vehicle attitude responsive control means operably connected with said second valve means to unlock the same and thereby render said second valve means active to over-ride the control effect of the said first valve means.

7. In an air suspension system for a motor vehicle having an air spring positioned between the sprung mass and the unsprung mass of the vehicle for resilient support of the sprung mass on the unsprung mass and having control means supplying air to the air spring and exhausting air from the air spring as actuated in response to attitude changes of the vehicle, the combination of, air spring means to be controlled positioned between the sprung mass and the unsprung mass of a vehicle, a source of air under pressure, and a control device connected with said air source and including operating means connected with the vehicle to operate the said control device in response to attitude change of the vehicle relative to the running gear thereof and having a first damped valve means controlling air flow to the air spring from said air source and exhaust of air from said air spring to effect thereby slow rate of response of the air spring in responding to a change in clearance height between the sprung mass and the unsprung mass of said vehicle and having a second undamped valve means controlling flow of air under pressure to said air spring and exhaust of air therefrom in response to attitude change of the vehicle to effect thereby a fast rate of response of the air spring in responding to an angular change of attitude of the sprung mass relative to the unsprung mass of the vehicle and locked in an inactive position to permit thereby said first valve means to be effective to control said air spring, and vehicle attitude responsive control means operably connected with said second valve means and actuated by a change in angular attitude of the sprung mass relative to the unsprung mass of the vehicle to unlock said second valve means during the period of said angular change of attitude and render thereby said second valve means active to over-ride the control effect of the said first valve means during the period of said angular change of attitude.

8. In an air suspension system for a motor vehicle having an air spring positioned between the sprung mass and the unsprung mass of the vehicle for resilient support of the sprung mass on the unsprung mass and having control means supplying air to the air spring and exhausting air from the air spring as actuated in response to attitude changes of the vehicle, the combination of, air spring means to be controlled positioned between the sprung mass and the unsprung mass of a vehicle, a source of air under pressure, a control device connected with said air source and having a first damped valve means controlling air flow to the air spring from said source and exhaust of air from said air spring to effect thereby slow rate of response of the air spring in responding to a change in clearance height between the sprung mass and the unsprung mass of the vehicle and having a second undamped valve means controlling flow of air under pressure to said air spring and exhaust of air therefrom to effect thereby a fast rate of response of the air spring in responding to an angular change of attitude of the sprung mass relative to the unsprung mass of the vehicle and including means locking said second valve means in an inactive position to permit said first valve means to be effective to control said air spring so long as said second valve means is in said locked position, operating means connecting said control device with said vehicle to operate the said valve means of the said control device in response to the said attitude changes and including overtravel mechanism in the operating connection between the said vehicle and the said control device to allow for greater movement between the sprung mass and the unsprung mass of the vehicle than is provided for actuation of the said valve means, said overtravel mechanism being capable of operating either of said valve means during either of the aforesaid attitude changes of the sprung mass relative to the unsprung mass, and vehicle attitude responsive control means operably connected with said second valve means and actuated by angular change of attitude of the sprung mass relative to the unsprung mass of the vehicle to unlock the said second valve means whereby to over-ride the control effect of the first valve means during the period of said angular change of attitude.

References Cited in the file of this patent

UNITED STATES PATENTS

| | | |
|---|---|---|
| 2,115,072 | Hunt et al. | Apr. 26, 1938 |
| 2,670,201 | Rossman | Feb. 23, 1954 |
| 2,762,633 | Gouirand | Sept. 11, 1956 |

FOREIGN PATENTS

| | | |
|---|---|---|
| 1,110,226 | France | Oct. 5, 1955 |